(12) United States Patent
Rohde et al.

(10) Patent No.: US 11,320,076 B2
(45) Date of Patent: May 3, 2022

(54) CONNECTOR FOR CONNECTION BETWEEN TWO FLUID-CONVEYING ELEMENTS

(71) Applicant: TI Automotive (Fuldabrück) GmbH, Fuldabrück (DE)

(72) Inventors: Reiner Rohde, Malsfeld (DE); Iris Barthel, Schauenburg (DE); Kay Bube, Schanklengsfeld (DE); Andre Häckel, Waldeck (DE); Alexander Bol, Baunatal (DE); Gerd Fischbach, Borken (DE); Harald Knobloch, Heidelberg (DE)

(73) Assignee: TI AUTOMOTIVE (FULDABRÜCK) GMBH, Fuldabrück (DE)

(*) Notice: Subject to any disclaimer, the term of this patent is extended or adjusted under 35 U.S.C. 154(b) by 457 days.

(21) Appl. No.: 16/211,895

(22) Filed: Dec. 6, 2018

(65) Prior Publication Data

US 2019/0178429 A1 Jun. 13, 2019

(30) Foreign Application Priority Data

Dec. 11, 2017 (EP) .................................. 17206495

(51) Int. Cl.
*F16L 37/12* (2006.01)
*F16L 37/088* (2006.01)

(52) U.S. Cl.
CPC ....... *F16L 37/1225* (2013.01); *F16L 37/0885* (2019.08)

(58) Field of Classification Search
CPC . F16L 37/088; F16L 37/0885; F16L 37/1225; F16L 2201/10
See application file for complete search history.

(56) References Cited

U.S. PATENT DOCUMENTS

| 2,805,089 A | 9/1957 | Hansen |
| 3,151,891 A | 10/1964 | Sanders |
| 5,855,399 A | 6/1999 | Profunser |
| 7,695,024 B2 * | 4/2010 | Ostergren ............. F16L 37/144 285/308 |

(Continued)

FOREIGN PATENT DOCUMENTS

| DE | 10 2014 113123 A1 | 6/2015 |
| EP | 0 750 152 A1 | 12/1996 |

(Continued)

OTHER PUBLICATIONS

European Search Report, European Application No. 17206495.8, dated May 4, 2018, 2 pgs.

*Primary Examiner* — Matthew Troutman
*Assistant Examiner* — Alexander T Rufrano
(74) *Attorney, Agent, or Firm* — Dickinson Wright PLLC

(57) ABSTRACT

A connector for connection between two fluid-conveying elements, in particular for connection between two motor vehicle pipes, with a female plug-in part and a male plug-in part which is insertable into the female plug-in part. A retainer is connected to the female plug-in part, the retainer allowing the male plug-in part to be fixed, in the inserted state, to the female plug-in part. The retainer may be pivoted from an open position to a fixing position—and vice versa—about a pivot axis arranged in the region of the outer surface of the female plug-in part.

14 Claims, 6 Drawing Sheets

(56) References Cited

U.S. PATENT DOCUMENTS

| | | | | |
|---|---|---|---|---|
| 9,188,267 B2 * | 11/2015 | Fansler | ............... | F16L 37/144 |
| 9,958,098 B2 * | 5/2018 | Nezu | ................. | F16L 37/0885 |
| 10,156,308 B2 * | 12/2018 | Nezu | ................. | F16L 37/0885 |
| 10,344,900 B2 * | 7/2019 | Bauer | ............... | F16L 37/0885 |
| 2004/0183301 A1 | 9/2004 | Yoshida | | |
| 2015/0167880 A1 | 6/2015 | An et al. | | |

FOREIGN PATENT DOCUMENTS

| | | | | | |
|---|---|---|---|---|---|
| JP | 2009121668 A | * | 6/2009 | ......... | F16L 37/0885 |
| WO | WO 2013/166536 A1 | | 11/2013 | | |

* cited by examiner

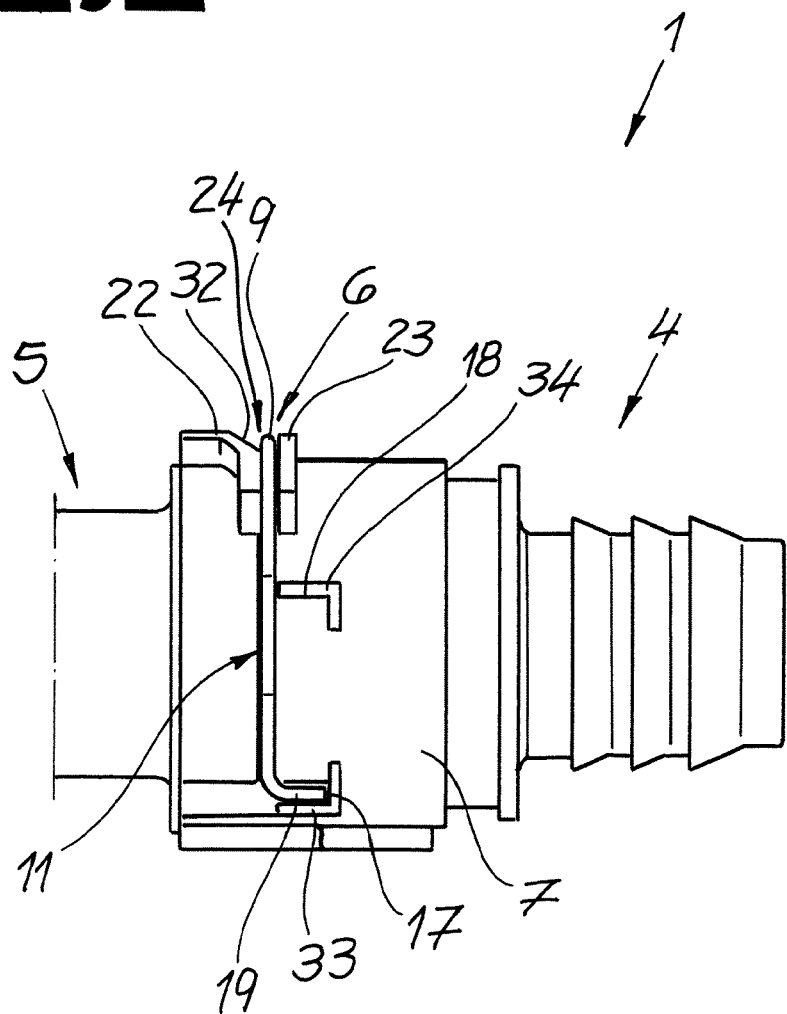

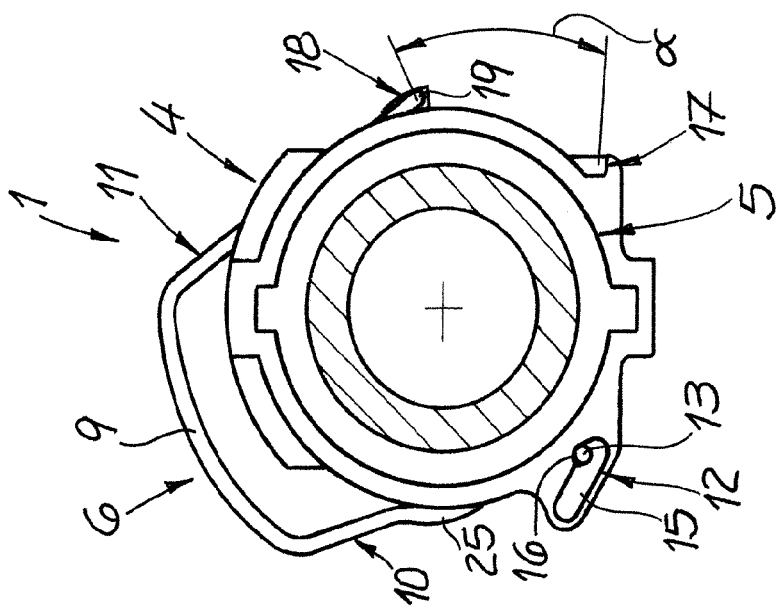
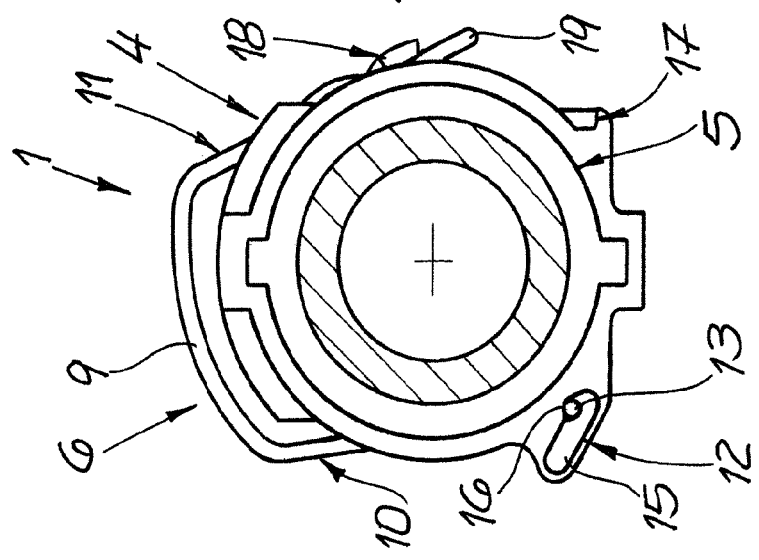
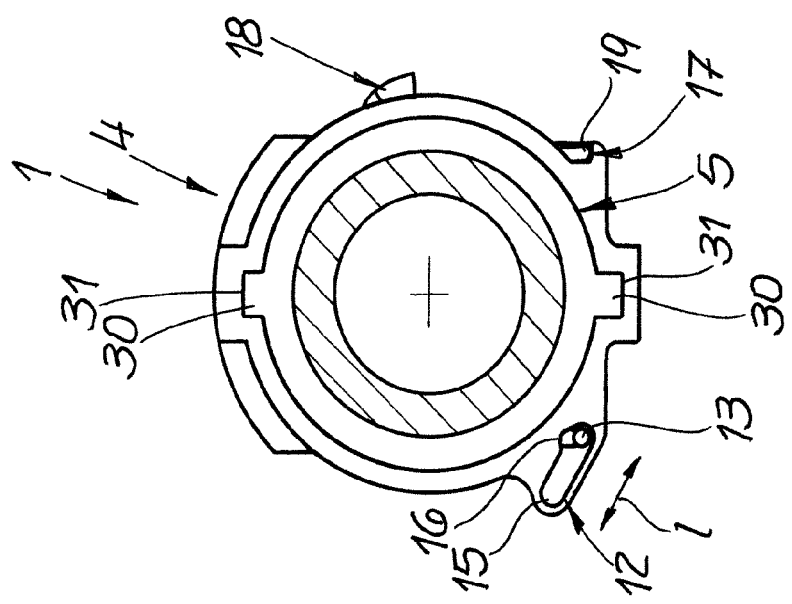

CONNECTOR FOR CONNECTION BETWEEN TWO FLUID-CONVEYING ELEMENTS

RELATED APPLICATIONS

The present patent document claims the benefit of and priority to European Patent Application 17 206 495.8, filed Dec. 11, 2017, and entitled "Connector For Connection Between Two Fluid-Conveying Elements" the entire contents of which are incorporated herein by reference.

FIELD

The invention relates to a connector for connection between two fluid-conveying elements—in particular for connection between two motor vehicle pipes—with a female plug-in part and a male plug-in part, wherein a retainer is connected to the female plug-in part, the retainer allowing the male plug-in part to be fixed, in the inserted state, to the female plug-in part. The connector in the preferred embodiment is a quick connector (Quick Connector). According to an embodiment, the connector is used for connection between two pipes, in particular two motor vehicle pipes. It is also within the scope of the invention that the connector connects a fluid-conveying unit—for example a tank, a pump, a heat exchanger, a thermostat, a valve or the like—with a pipe, in particular a motor vehicle pipe. In principle, the connector can also be used for connection between two fluid-conveying units.

BACKGROUND

Connectors or quick connectors of the type described above are known in practice in different embodiments. The known connectors often have the disadvantage that the male plug-in part fixing the female plug-in retainer is relatively difficult to be transferred, also by exerting a considerable force, into its fixing position and is often difficult, while exerting a relatively high force, to be brought back into its open position. The relatively complicated assembly or disassembly of the retainer on the known connectors often causes connection errors or failure-prone connections. A further disadvantage of the known connector is that the retainer is completely separated from the connector, in particular when it is transferred to the open position, and thus represents a component that may be lost. In addition, at least in some known connectors not always a functionally reliable and tight connection between the male plug-in part and female plug-in part may be realized. In this regard, the known connector or quick connector is in need of improvement.

BRIEF SUMMARY

Accordingly, the object of the invention consists in providing a connector of the type mentioned, in which the disadvantages listed above may be avoided and in which especially the retainer may be transferred, in a very simple and reliable manner, both in the fixing position and in the open position. Furthermore, the problem of the possible loss of the retainer has to be solved.

To achieve this object, the invention teaches a connector for connection between two fluid-conveying elements, in particular for connection between two motor vehicle pipes, —with a female plug-in part and a male plug-in part insertable into the female plug-in part —, the retainer allowing the male plug-in part to be fixed, in the inserted state, to the female plug-in part and wherein the retainer may be pivoted from an open position to a fixing position—and vice versa—about a pivot axis arranged in the region of the outer surface of the female plug-in part.

According to a particularly preferred embodiment of the invention, the connector is designed as a quick connector (Quick Connector). The female plug-in part and the male plug-in part expediently consist of at least one plastic or substantially of at least one plastic. It is recommended that the female plug-in part and/or the male plug-in part consist of at least one plastic or substantially of at least one plastic from the group composed of "aliphatic polyamide, aromatic polyamide, polyphenylene sulfide" (PPS). Basically, the two plug-in parts may also consist or consist essentially of other plastic materials. Conveniently, the retainer consists of a metal or substantially of a metal. It has been proven to be advantageous if the retainer is made of steel or essentially of steel.

A preferred embodiment, which has special significance in the context of the invention, is characterized in that the retainer is U-shaped with a U-bracket and two U-legs connected to the U-bracket. Conveniently, the two U-legs are resiliently connected to the U-bracket. It is recommended that the two U-legs each form an arcuate curvature directed to the outer side of the U. It is recommended that the arcuate curvature is arranged in each case with respect to the length of the respective U-leg in the middle third of the U-leg. The arcuate curvature of a U-leg expediently extends over at least one fifth and at most over half the length of the respective U-leg.

According to the invention, the retainer is moved from an open position into a fixing position or out of the fixing position into the open position pivotably or rotatably about a pivot axis arranged in the region of the outer surface of the female plug-in part or rotation axis. It is within the scope of the invention that the retainer is pivotable or rotatable in the direction transverse to the longitudinal axis L of the female plug-in part or to the longitudinal axis L of the male plug-in part. Preferably, the pivot axis or rotation axis is arranged at one end of a first U-leg of the retainer or the pivot axis or rotation axis is formed by this end of the U-leg. In a highly recommended embodiment of the invention, the retainer engages with the end of the first U-leg in a pivot recess of the female plug-in part and expediently, the pivot axis or rotation axis is arranged in this pivot recess. It is within the scope of the invention that the retainer or the first U-leg or the end of the first U-leg is fixed in the pivot recess of the female plug-in part, so that the retainer is preferably held captive on the female plug-in part. The captivity of the retainer is a particularly advantageous feature of the invention.

A particularly preferred embodiment of the invention is characterized in that at the one end of the first U-leg forming the pivot axis at least one—preferably one—pivot extension is connected, which is transverse to the longitudinal direction of the first U-leg. Preferably, this pivot extension forms the pivot axis of the retainer. Conveniently, the pivot extension is oriented perpendicular or substantially perpendicular to the longitudinal direction of the first U-leg. The length of the pivot extension is recommended to be at most 50%, preferably at most 40%, preferably at most 30% and very preferably at most 25% of the length of the associated first U-leg.

According to the recommended embodiment of the invention the end of the first U-leg forming the pivot axis or the pivot extension positioned on the end of the first U-leg engages in a pivot recess of the female plug-in part, which has a closed circumference. Conveniently, in this engagement state, the pivot extension or the longitudinal extent of the pivot extension of the first U-leg is oriented parallel or substantially parallel to the longitudinal axis L of the female plug-in part. It is also within the scope of the invention that the engagement direction of the pivot extension is arranged in the pivot recess parallel or substantially parallel to the longitudinal axis L of the female plug-in part. Furthermore, it is within the scope of the invention that the pivot axis or rotation axis of the retainer is oriented parallel or substantially parallel to the longitudinal axis L of the female plug-in part.

According to an embodiment of the invention, the pivot recess of the female plug-in part is formed as a pivot hole of the female plug-in part and the end of the first U-leg or a pivot extension connected to the first U-leg engages with a form fit in this pivot recess or pivot hole. Appropriately, this engagement of the end of the first U-leg or of the pivot extension in the pivot recess/pivot hole is free from play or substantially free from play. It is within the scope of the invention that the pivot axis of the retainer is arranged in the pivot hole. It is also within the scope of the invention that the pivot recess of this embodiment or the pivot hole is oriented parallel or substantially parallel to the longitudinal axis L of the female plug-in part.

According to another embodiment of the invention, the pivot recess of the female plug-in part is formed as a slot and the end of the first U-leg or a pivot extension connected to the first U-leg engages with play in this slot. It is within the scope of the invention that the pivot axis of the retainer is arranged in the slot. Expediently, the longitudinal extension I of the slot is oriented transversely to the longitudinal axis L of the female plug-in part. According to a particularly preferred embodiment of the invention, the slot has a groove transverse to the longitudinal extent of the slot, wherein the end of the first U-leg or the pivot extension connected to the first U-leg at least when pivoting the retainer in the open position or in the fixing position is arranged in the groove of the slot. It is recommended that in this case the end of the first U-leg or the pivot extension connected to the end of the first U-leg engage in a form-fitting manner in the groove of the slot.

It is within the scope of the invention that the second U-leg—in particular the second U-leg opposite the pivot axis—may be fixed or latched with its end in the fixing position of the retainer on the female plug-in part. Preferably, the end of the second U-leg may be fixed or latched in a fixing recess arranged on the outer surface of the female plug-in part. It is recommended that the fixing recess or the end fixed or latched in the fixing recess of the second U-leg is at least partially covered and protected at least partially to the outside of the connector or the female plug-in part by a cover element. It is recommended that the second U-leg may be fixed or latched with its end in the open position of the retainer on the female plug-in part. Preferably, the end of the second U-leg is thereby fixable or latchable in an open position recess arranged on the outer surface of the female plug-in part. It is recommended that, the open position recess has an abutment for the end of the second U-leg, which is positioned in the pivot direction of the retainer. The pivoting direction of the retainer here means the pivoting direction from the fixing position into the open position. It is recommended that the open position recess or the end of the second U-leg fixed or latched in the open-position recess is at least partially covered towards the outside of the connector by a second cover element.

According to a particular embodiment of the invention, the second U-leg may be fixed or latched with its end in an intermediate position of the retainer on the female plug-in part. In this case, the second U-leg or the end of the second U-leg is expediently fixable or latchable in a intermediate position recess arranged on the outer surface of the female plug-in part. The intermediate position recess is preferably located between the fixing recess and the open position recess on the outer surface of the female plug-in part.

A particularly recommended embodiment of the invention is characterized in that at the end of the second U-leg a U-extension extending transversely to the longitudinal direction of the second U-leg is provided. Conveniently, the U-extension extends perpendicularly or substantially perpendicular to the longitudinal direction of the second U-leg. It is within the scope of the invention that the U-extension of the second U-leg in the fixing position may be fixed or latched in the fixing recess and/or in the intermediate position in the intermediate position recess and/or in the open position in the open position recess. It is also within the scope of the invention that the retainer is provided at the ends of its U-legs with a respective extension—in particular the pivot extension on the one hand and the U-extension on the other hand —. According to a particularly well-proven embodiment of the invention, the two extensions extend in opposite directions from the retainer. Preferably, both extensions are arranged perpendicular or substantially perpendicular to the respective associated U-legs. Conveniently, both extensions are oriented, in the mounted functional position of the retainer, parallel or substantially parallel to the longitudinal axis L of the female plug-in part. It is recommended that the length of both extensions is at most 50%, preferably at most 40%, preferably at most 30% and more preferably at most 25% of the length of the respective associated U-leg. It is within the scope of the invention that the length of both extensions is the same or substantially the same. Furthermore, it is within the scope of the invention that the length of the two U-legs is the same or substantially the same.

Preferably, the end of the second U-leg or the U-extension on the second U-leg is pivoted from the fixing position to the open position over a pivot angle α of 20° to 100°, preferably from 20° to 90°, preferably from 25° to 80° and most preferably from 25° to 70° and more preferably from 25° to 60° about the pivot axis. In this case, the retainer is suitably held captive in the pivot recess. It is within the scope of the invention that the distance of the U-bracket to the female plug-in part increases when pivoting from the fixing position into the open position.

It is also within the scope of the invention that the male plug-in part is inserted into a plug-in recess of the female plug-in part. Preferably, in the mounted or inserted state of the male plug-in part, at least one sealing element is provided between the female plug-in part and the male plug-in part. The sealing element is recommended to be a circumferential sealing ring surrounding the circumference of the male plug-in part or O-ring seal. According to a preferred embodiment of the invention, a spacer ring between the male plug-in part and the female plug-in part is arranged in the mounted or inserted state of the male plug-in part. It is within the scope of the invention that the spacer ring is positioned, in the insertion direction, in front of the at least one sealing element, preferably in front of the at least one sealing ring or O-ring seal. An embodiment of the invention is characterized in that the spacer ring is locked with the female plug-in part. According to an alternative embodiment the spacer ring is welded to the female plug-in part.

It is recommended that the male plug-in part has at least one positive locking element, which engages in the assembled or inserted state of the male plug-in part in a form-fitting recess of the female plug-in part. Expediently, the at least one positive-locking element protrudes from the outer surface of the male plug-in part and engages in a positive-locking recess on the inner surface of the plug-in recess of the female plug-in part. According to a recommended embodiment of the invention, the male plug-in part is provided on its outer surface with two positive locking elements—which are preferably arranged opposite to the outer surface of the male plug-in part—and which preferably engage in two form-fitting recesses on the inner surface of the plug recess of the female plug-in part.

According to a particularly preferred embodiment of the invention, the two U-legs of the retainer pass, in the fixing position of the retainer, respectively through a retainer recess of the female plug-in part and each engage in an engagement recess of the male plug-in part. It is recommended that, the female plug-in part has two opposite retainer recesses, which are preferably formed as retainer slots for the two U-legs. The engagement recesses of the male plug-in part are preferably part of an engagement groove for both U-legs surrounding at least most of the circumference of the male plug-in part. According to an embodiment of the invention, the engagement groove is an engagement groove running over the entire circumference of the male plug-in part. During the transfer of the retainer from its fixing position into the open position, at least the second U-leg opposite the pivot axis is expediently disengaged from the engagement recess of the male plug-in part and preferably also disengaged from the retaining recess of the female plug-in part. According to an embodiment of the connector, the second U-leg engages in the open position only partially in the retainer recess of the female plug-in part. It is within the scope of the invention that in the open position of the retainer also the first U-leg provided with the pivot axis is out of engagement with the engagement recess of the male plug-in part. In the open position of the retainer thus the male plug-in part may be easily pulled out again from the female plug-in part.

According to a preferred embodiment of the invention, the U-bracket of the retainer is arranged in the fixing position of the retainer between two fixing flanges of the female plug-in part. In this case, preferably at least a part of the U-bracket protrudes into the intermediate space between the two fixing flanges. Conveniently, in the open position of the retainer, the U-bracket does not protrude into the intermediate space between the two fixing flanges. Preferably, the U-bracket is then arranged at a distance or at a radial distance from the two fixing flanges of the female plug-in part.

The invention also relates to a female plug-in part for a connector according to the invention, wherein a retainer is connected to the female plug-in part, with which the male plug-in part in the inserted state is fixable to the female plug-in part and wherein the retainer is pivotable or rotatable from an open position to a fixing position—and vice versa—about a pivot axis or rotation axis which is positioned on the outer surface of the female plug-in part. In this case, the retainer preferably engages in a pivot recess on the outer surface of the female plug-in part and is preferably captively received in the pivot recess of the female plug-in part.

The invention is based on the finding that in the connector according to the invention, compared to connectors known from the prior art, a much simpler, easy to handle and functionally reliable transfer of the retainer from the fixing position to the open position and vice versa is possible. This transfer of the retainer is on the one hand very reliable and on the other hand possible with relatively little effort. Nevertheless, the retainer is securely held and fixed in the fixing position, so that even with vibration or similar mechanical stresses no automatic transfer of the retainer takes place in the open position. Another advantage of the invention compared to the known connectors is that the retainer is held captive according to the invention on the female plug-in part. Furthermore, it should be emphasized that in the connector according to the invention nonetheless a very tight and precise connection between male and female plug-in part may be realized. Of particular advantage is further that the male plug-in part is insertable with low or reduced insertion forces in the female plug-in part in comparison to many other connectors. It should also be emphasized that the connector according to the invention may be implemented with relatively inexpensive and cost-effective measures.

BRIEF DESCRIPTION OF THE DRAWINGS

The invention will be explained in more detail with reference to a drawing illustrating an embodiment of the invention. In a schematic representation:

FIG. 6 shows a side view of a third embodiment of the connector according to the invention;

FIG. 7 shows a front view of the object according to FIG. 6 in a first functional position;

FIG. 8 shows the object according to FIG. 7 in a second functional position;

FIG. 9 shows the object according to FIG. 7 in a third functional position.

DETAILED DESCRIPTION

Figure 2:
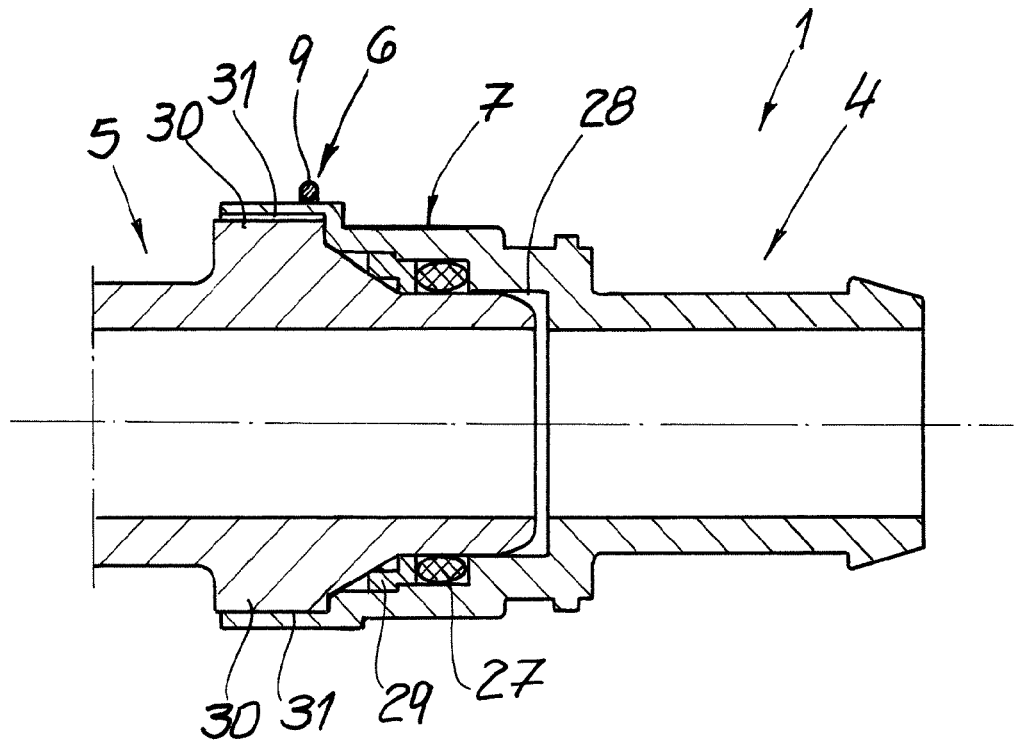
FIG. 2 shows a longitudinal section through the connector according to the invention.

The figures show a connector 1 according to the invention for connection between two fluid-conveying elements, in particular for connection between two motor vehicle pipes 2, 3. The connector 1 has a female plug-in part 4 and a male plug-in part 5 which is insertable into the female plug-in part 4. At the female plug-in part 4, a retainer 6 is connected and preferably connected in a captive way. With this retainer 6, the male plug-in part 5 in the inserted state (FIG. 2) may be fixed to the female plug-in part 4. The retainer 6 may be transferred from an open position (see, for example, FIG. 4) into a fixing position (see, for example, FIG. 3) and vice versa, and according to the invention it is pivoted about a pivot axis 8 arranged in the region of the outer surface 7 of the female plug-in part 4. The pivoting of the retainer takes place by a pivot angle α, which may be about 45° in the present exemplary embodiment.

Figure 10:
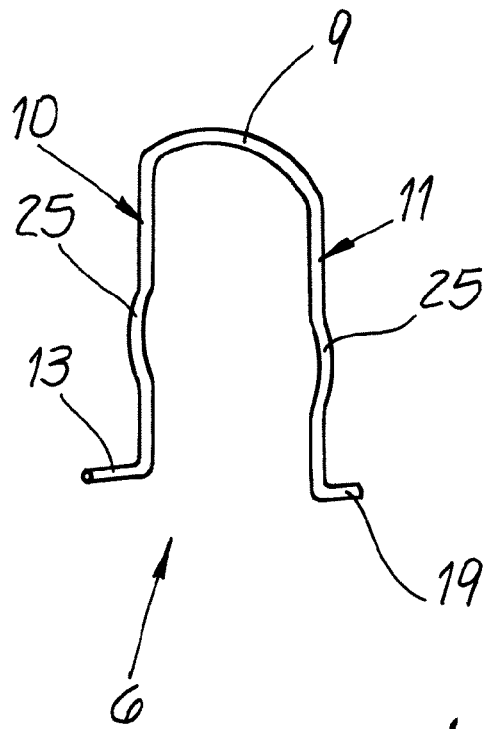
FIG. 10 shows a perspective view of a retainer for the connector according to the invention.

According to a particularly preferred embodiment and in the example (see in particular FIG. 10), the retainer 6 is U-shaped with a U-bracket 9 and two U-legs 10, 11 connected to the U-bracket 9. It is within the scope of the invention that the retainer 6 is pivotable in the direction transverse to the longitudinal axis L of the female plug-in part 4 or about the pivot axis 8 (for example, when comparing FIGS. 3 and 4). According to a preferred embodiment and in the example, the retainer 6 on each U-leg 10, 11 has an arcuate curvature 25, which is directed towards the outside of the connector. Preferably, and in the example, this arcuate curvature 25 is positioned, with respect to the length of the respective U-leg 10, 11 in the middle third of the respective U-leg 10, 11.

A particularly recommended embodiment of the invention is characterized in that the retainer 6 engages with the end of its first U-leg 10 in a pivot recess 12 of the female plug-in part 4 and that the pivot axis 8 is arranged in this pivot recess 12. Preferably, at the end forming the pivot axis 8 of the first U-leg 10 at least one pivot extension 13 transverse to the longitudinal direction of the first U-leg 10 is connected, which is preferably oriented in the example perpendicular to the first U-leg 10. Preferably, this pivot extension 13 preferably forms the pivot axis 8 of the retainer 6.

It is recommended that in the embodiment the pivot extension 13 connected to the end of the first U-leg 10 engages in a pivot recess 12 of the female plug-in part 4, which is closed over its circumference (see in particular FIG. 4 and FIGS. 7 to 9). According to an embodiment and in the example of FIG. 4, the pivot recess 12 is formed as a pivot hole 14 of the female plug-in part 4 and the pivot extension 13 connected to the end of the first U-leg 10 engages positively and expediently without play or essentially without play in this pivot hole 14. The pivot axis 8 is arranged in this pivot hole 14. In particular, in the embodiment of FIGS. 6 to 9, however, the pivot recess 12 is formed as a slot 15 and the pivot extension 13 connected to the first U-leg 10 engages with play in the slot 15, wherein the pivot axis 8 of the retainer 6 is arranged in the slot 15. This embodiment will be explained in more detail below.

According to a preferred embodiment and in the example, the second U-leg 11 of the retainer 6 may be fixed or latched with its end in the fixing position of the retainer 6 on the female plug-in part 4 and it may be fixed and latched as preferred and shown in the example, in a fixing recess 17 positioned on the outer surface 7 of the female plug-in-in part 4. Furthermore, according to a preferred embodiment, the second U-leg 11 may be fixed or latched with its end in the open position of the retainer 6 on the female plug-in part 4 and may be fixed or latched in the preferred embodiment in an open position recess 18 arranged on the outer surface 7 of the female plug-in part 4. It is recommended that at the end of the second U-leg 11 a U-projection 19 extending transversely to the longitudinal direction—preferably vertically positioned—of the second U-leg 11 is provided and preferably this U-extension 19 may be fixed or latched, in the fixing position and/or in the open position of the retainer 6, in the fixing recess 17 and/or in the open position recess 18.

Figure 3:
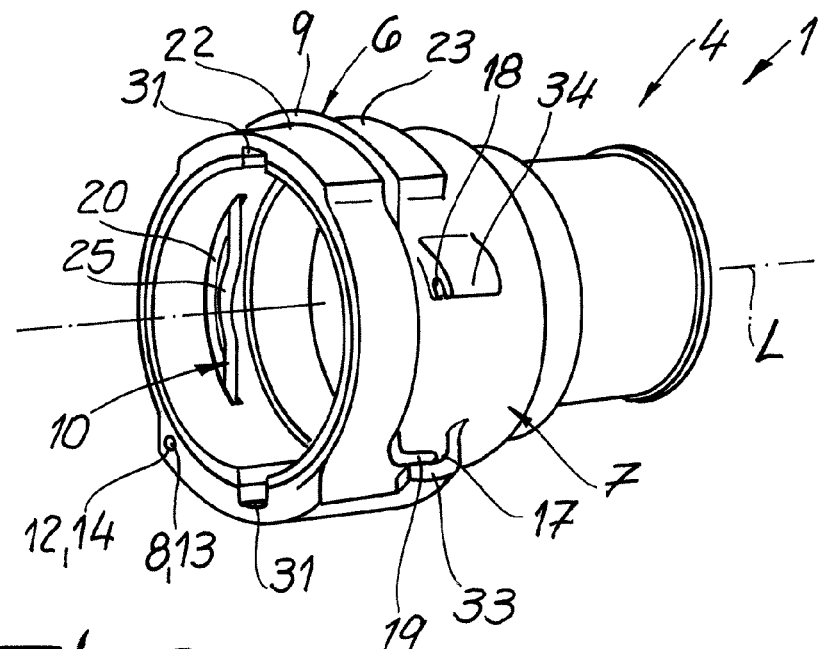
FIG. 3 shows a perspective view of a first embodiment of the connector according to the invention in a first functional position.
Figure 4:
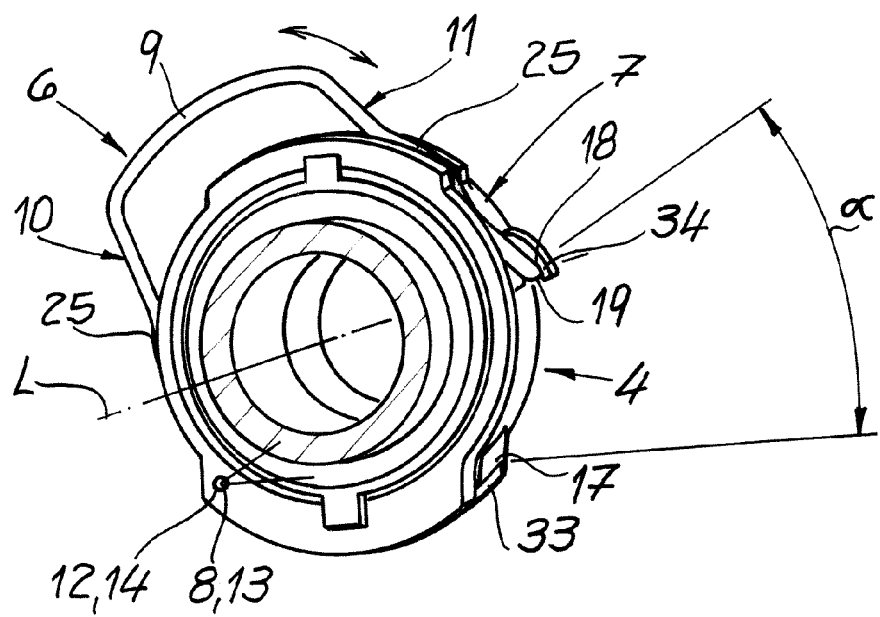
FIG. 4 shows a perspective view of the object according to FIG. 3 in a second functional position.
Figure 5:
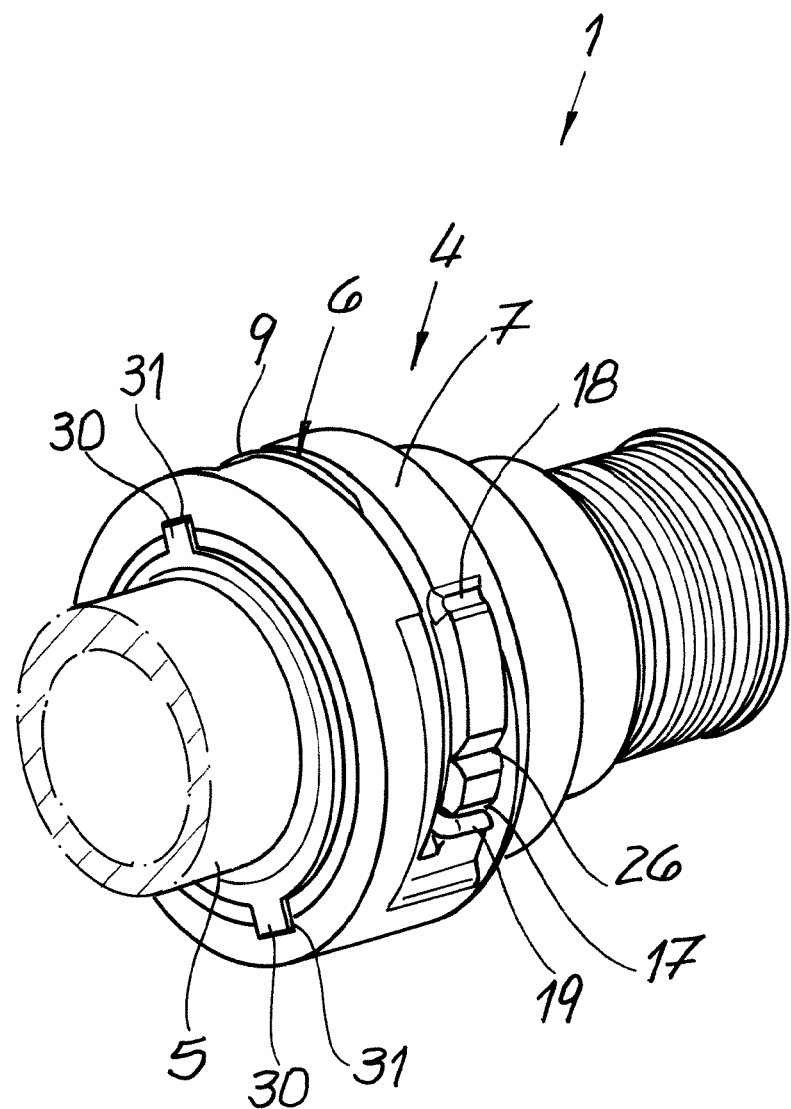
FIG. 5 shows a perspective view of a second embodiment of the inventive connector.

FIGS. 3 and 4 show a first embodiment of the connector according to the invention. Here, the second U-leg 11 or the U-extension 19 of the second U-leg 11 in the fixing position (FIG. 3) may be fixed or latched in the fixing recess 17 and in the open position (FIG. 4) in the open-position recess 18. In contrast, the second embodiment shown in FIG. 5 of the connector according to the invention also has an intermediate position in addition to the fixing position and the open position. Preferably, and in the embodiment of FIG. 5, the second U-leg 11 and the U-extension 19 of the second U-leg 11 in the intermediate position may be fixed or latched in an intermediate recess 26. In the second embodiment according to FIG. 5, therefore, three functional states are possible (open position, intermediate position and fixing position). In the third embodiment of the connector according to the invention (FIGS. 6 to 9), once again only one fixing position and one open position are provided.

Preferably, in the fixing position and the open position of the retainer 6 on the fixing recess 17 on the one hand and on the open position recess 18 on the other hand an abutment for the U-extension 19 of the second U-leg is present, which blocks further pivoting of the retainer 6 about the pivot axis 8. According to a recommended embodiment, the U-extension 19 is protected with respect to the outside of the connector 1 in the fixing position and/or in the open position by a respective cover element 33, 34 connected to the female plug-in part 4. These preferred cover elements 33, 34 may be seen in particular in FIG. 4.

Figure 1:
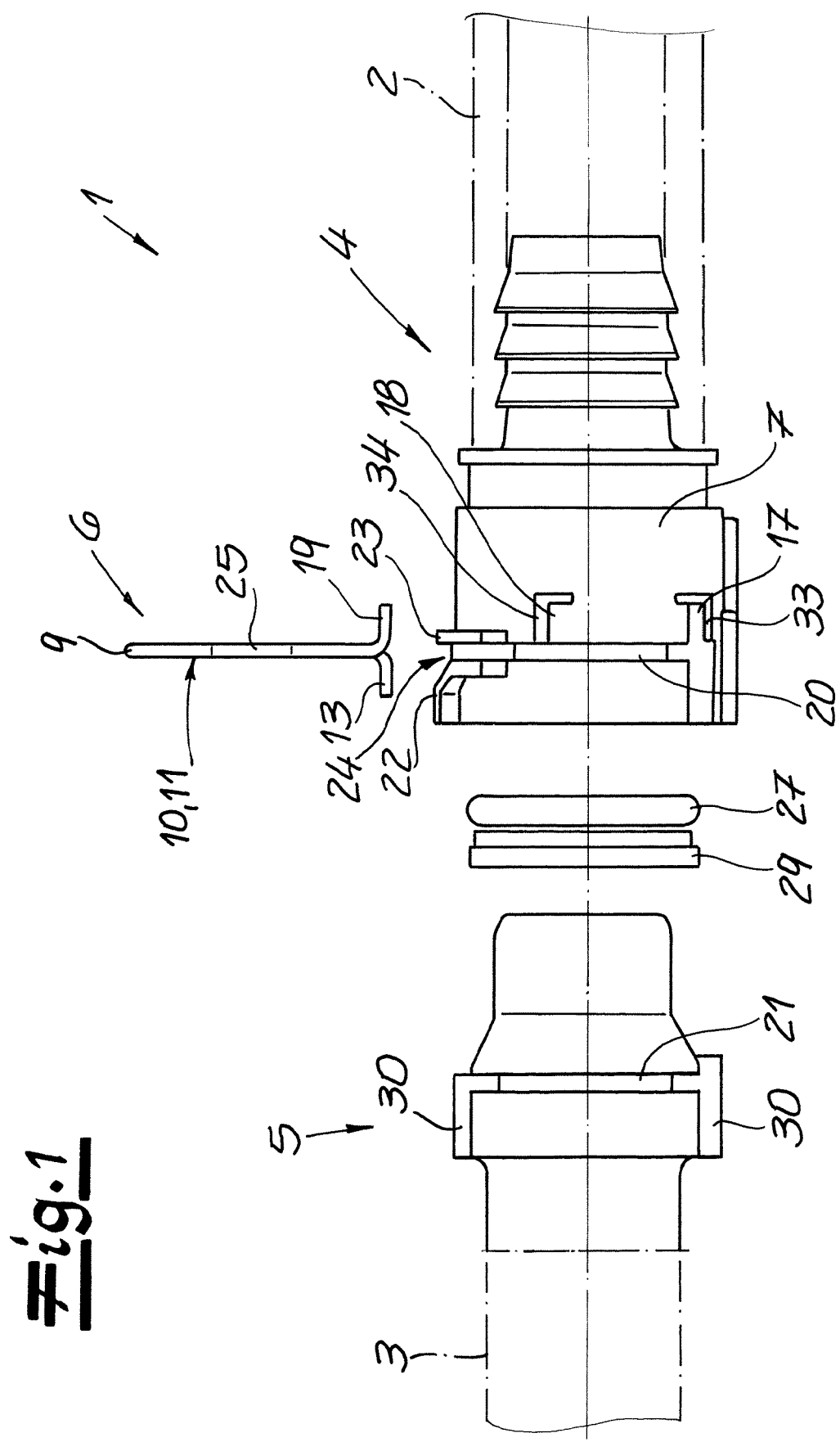
FIG. 1 shows an exploded view of the inventive connector.

The male plug-in part 5 may be expediently inserted, as in the example, (see in particular FIGS. 1 and 2) with the interposition of a sealing element preferably designed as a sealing ring 27 in the plug recess 28 of the female plug-in part 4. It is recommended that (as shown in the example in particular of FIGS. 1 and 2) in the inserted state (FIG. 2) a spacer ring 29 is interposed between male plug-in part 5 and the sealing ring 27. Preferably, and as shown in the exemplary embodiment, the male plug-in part 5 has positive-locking elements 30, which in the inserted state respectively engage in a form-fitting recess 31 of the female plug-in part 4. Preferably, and in the exemplary embodiment, the male plug-in part 5 is provided with two positive-locking elements 30 arranged on its outer surface and opposite one another, and the female plug-in part 4 has two complementary form-fitting recesses 31.

It is within the scope of the invention that the two U-legs 10, 11 of the retainer 6 in the fixing position of the retainer 6 each pass through a retainer recess 20 of the female plug-in part 4. Preferably and in the exemplary embodiment, the retainer recesses 20 of the female plug-in part 4 are formed as opposite retainer slits (see in particular FIGS. 1 and 3). In the inserted state of the male plug-in part 5 and in the fixing position of the retainer 6, the two U-legs 10, 11 of the retainer 6 also engage respectively in an engagement recess 21 of the male plug-in part 5. These engagement recesses 21 are in the embodiment according to the figures part of a circumferential engagement groove which runs essentially over the circumference of the male plug-in part 5 (see in particular FIGS. 1 and 2). In the inserted state of the male plug-in part 5 and in the fixing position of the retainer 6 the two U-legs 10, 11 of the retainer 6 thus pass through on the one hand, the retainer recesses 20 and retainer slots of the female plug-in part 4 and on the other hand they engage in the engagement recesses 21 and in the engagement groove of the male plug-in part 5. Thus, the male plug-in part 5 is held in a functionally reliable way in the female plug-in part 4. After a possible transfer of the retainer 6 in its open position, the male plug-in part 5 may be easily released from the female plug-in part 4 or be pulled out of the plug recess 28 of the female plug-in part 4. In this open position, the retainer 6 is nonetheless held captive on the female plug-in part 4.

According to a preferred embodiment of the invention, the U-bracket 9 of the retainer 6 in the fixing position of the retainer 6 is positioned between two fixing flanges 22, 23 of the female plug-in part 4 (see, for example, FIGS. 3 and 6). In the embodiment of FIG. 6, the U-bracket 9 of the retainer 6 is thereby completely accommodated in the intermediate space 24 between the two fixing flanges 22, 23. FIG. 6 also shows that, according to a preferred embodiment of the invention, the front fixing flange 22 has a retainer-side bevel 32, which facilitates the manipulation of the retainer 6.

It is within the scope of the invention that the retainer 6 is provided at the ends of its U-legs 10, 11 with a respective extension 13, 19 and in particular in a preferred way and as shown in the example, the pivot extension 13 on the one hand and the U-extension 19 on the other. According to a particularly recommended embodiment and as shown in the example, the two extensions 13, 19 extend in opposite directions from the retainer 6 (see in particular FIGS. 1 and 10). This orientation of the projections 13, 19 favors the capture of the retainer 6, when in the open position of the retainer 6 (FIG. 4), the pivot extension 13 engages on the one hand in the pivot recess 12 of the female plug-in part 4 and the U-extension 19 on the other hand in the open position recess 18 of the female plug-in part 4.

FIGS. 6 to 9 show a very particularly preferred embodiment of the connector 1 according to the invention. The pivot recess 12 of the female plug-in part 4 is formed here as a slot 15, wherein the pivot extension 13 of the first U-leg 10 engages with play in this slot 15. The pivot axis 8 of the retainer 6 is arranged here in the slot 15. It is recommended that the slot 15 has a slot groove 16 transversely arranged with respect to the longitudinal extension I of the slot 15, wherein the pivot extension 13 connected to the first U-leg 10, when pivoting the retainer 6 in the open position or in the fixing position, is positioned in this slot groove 16 of slot 15 (see FIGS. 8 and 9). This embodiment of the pivot recess 12 makes a particularly simple and functionally reliable manipulation of the retainer 6 possible while the retainer 6 is held captive in its open position on the female plug-in part 4.

The invention claimed is:

1. A connector for connecting two pipes, having a female plug-in part and a male plug-in part insertable into the female plug-in part, wherein a retainer is connected to the female plug-in part, by which retainer the male plug-in part is fixable, in the inserted state, to the female plug-in part and wherein the retainer is pivotable such that the retainer rotatably moves between an open position and a fixing position about a pivot axis arranged in the region of the outer surface of the female plug-in part,
wherein the retainer has a U-shape with a U-bracket and two U-legs connected to the U-bracket, and the retainer engages a pivot recess of the female plug-in part with an end of a first U-leg such that the pivot axis is arranged and positioned in the pivot recess, the pivot recess being formed with a closed circumference, and
wherein the pivot axis is formed by an opening in a flange projecting radially from the female plug-in part.

2. The connector according to claim 1, wherein the pivot axis is disposed at one end of a first U-leg of the retainer or is formed by one end of this U-leg.

3. The connector according to claim 1, wherein the retainer is pivotable in a direction transverse to the longitudinal axis L of the female plug-in part.

4. The connector according to claim 1, wherein at least one pivot extension extending transverse to the longitudinal direction of the first U-leg is connected to the end of the first U-leg and wherein, this pivot extension forms the pivot axis of the retainer.

5. The connector according to claim 1, wherein the pivot recess is formed as a pivot bore of the female plug-in part, wherein the end of the first U-leg or a pivot extension connected to the first U-leg engages the pivot bore in a positive lock and wherein the pivot axis is disposed in the pivot bore.

6. The connector according to claim 1, wherein the pivot recess is formed as a slot, wherein the end of the first U-leg or a pivot extension connected to the first U-leg engages the slot with play and wherein the pivot axis of the retainer is positioned in the slot.

7. The connector according to claim 6, wherein the slot has a slot groove disposed transversely with respect to a longitudinal extension of the slot, wherein the end of the first U-leg or of the pivot extension connected to the first U-leg is positioned within the slot groove of the slot at least when rotating the retainer into the open position or into the fixing position.

8. The connector according to claim 1, wherein a second U-leg opposite the pivot axis is fixable or latchable with its end to the female plug-in part in the fixing position of the retainer and is fixable or latchable in a fixing recess positioned on the outer surface of the female plug-in part.

9. The connector according to claim 1, wherein the second U-leg opposite the pivot axis is fixable or latchable, with its end, to the female plug-in part in the open position of the retainer and is fixable or latchable in an open-position recess positioned on the outer surface of the female plug-in part.

10. The connector according to claim 1, wherein a U-extension extending transversely to the longitudinal direction of the second U-leg is provided at the end of the second U-leg opposite the pivot axis and wherein, said U-extension is fixable or latchable in the fixing recess and/or in the open-position recess in the fixing and/or open position of the retainer.

11. The connector according to claim 1, wherein in the fixing position of the retainer, the two U-legs of the retainer each pass through a retaining recess of the female plug-in part and each engage an engaging recess of the male plug-in part.

12. The connector according to claim 1, wherein in the fixing position of the retainer, the U-bracket of the retainer is positioned between two fixing flanges of the female plug-in part and wherein, at least a part of the U-bracket projects into the intermediate space between the two fixing flanges.

13. The connector according to claim 1, wherein the retainer has a respective pivot extension at each end of its U-legs, including a pivot extension on one side and the U-extension on the other side of the retainer, and wherein the two extensions project in opposite directions from the retainer.

14. A connector for connecting two pipes, having a female plug-in part and a male plug-in part insertable into the female plug-in part, wherein a retainer is connected to the female plug-in part, by which retainer the male plug-in part is fixable, in the inserted state, to the female plug-in part and wherein the retainer is pivotable such that the retainer rotatably moves between an open position and a fixing position about a pivot axis arranged in the region of the outer surface of the female plug-in part,
wherein the retainer has a U-shape with a U-bracket and two U-legs connected to the U-bracket, and the retainer engages a pivot recess of the female plug-in part with an end of a first U-leg such that the pivot axis is arranged and positioned in the pivot recess, the pivot recess being formed with a closed circumference, and wherein the pivot axis is substantially transversely arranged relative to a plane of the closed circumference of the pivot recess.

* * * * *